No. 827,760. PATENTED AUG. 7, 1906.
G. H. STEWART.
MEANS FOR DETECTING DEFECTIVE CAN HEADS.
APPLICATION FILED JULY 8, 1905.
2 SHEETS—SHEET 1.
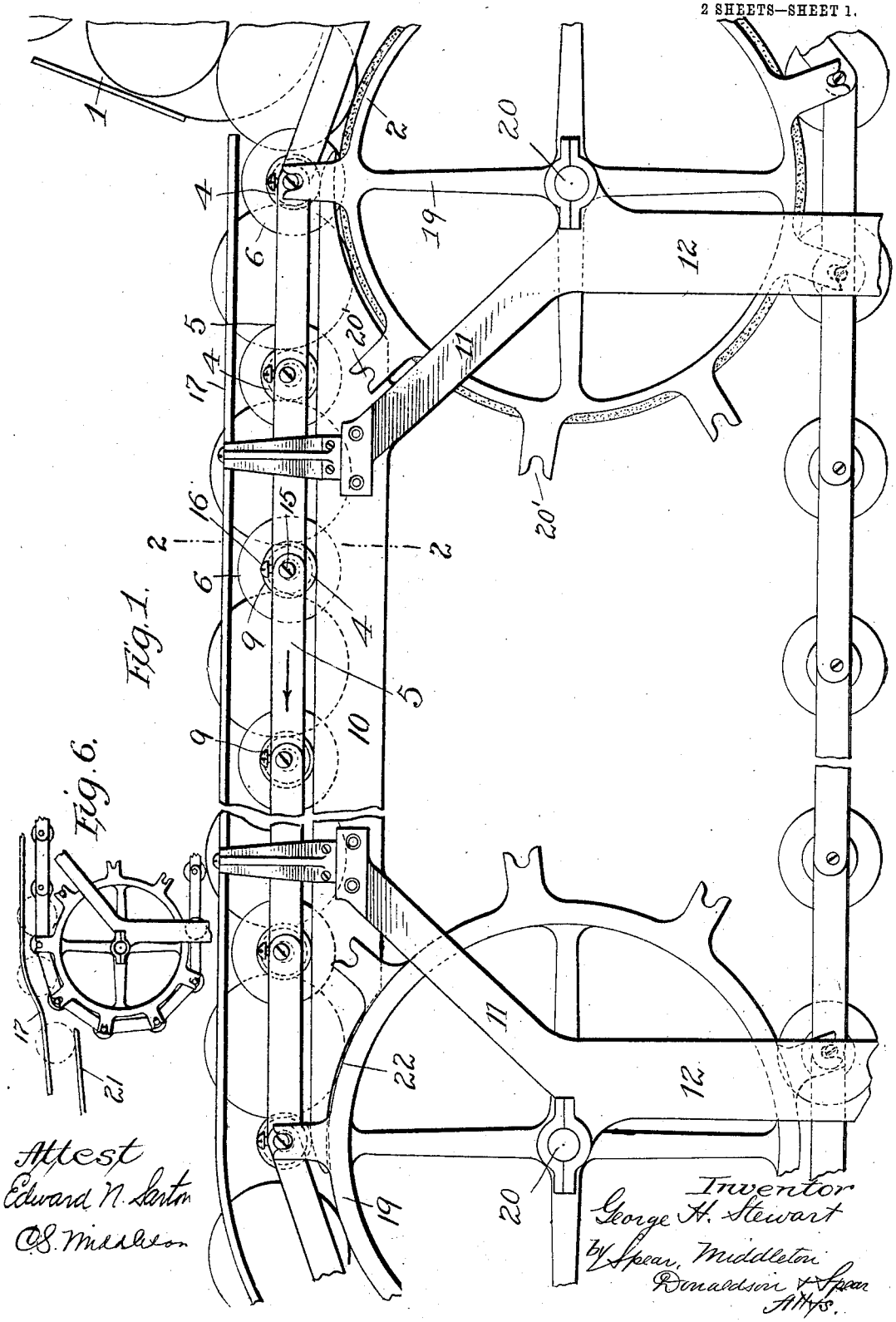

No. 827,760. PATENTED AUG. 7, 1906.
G. H. STEWART.
MEANS FOR DETECTING DEFECTIVE CAN HEADS.
APPLICATION FILED JULY 8, 1905.
2 SHEETS—SHEET 2.
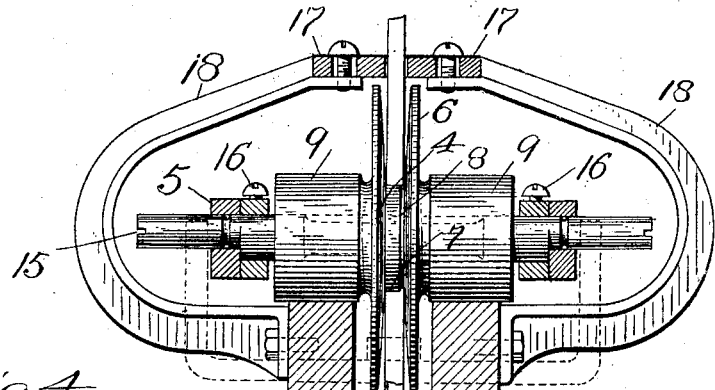
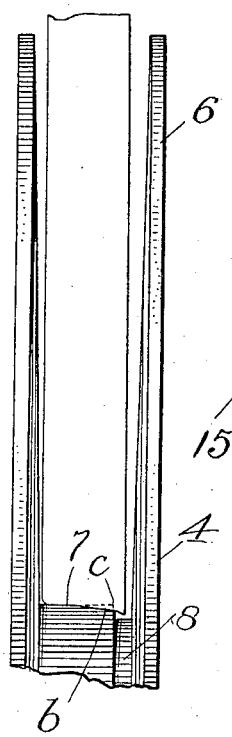
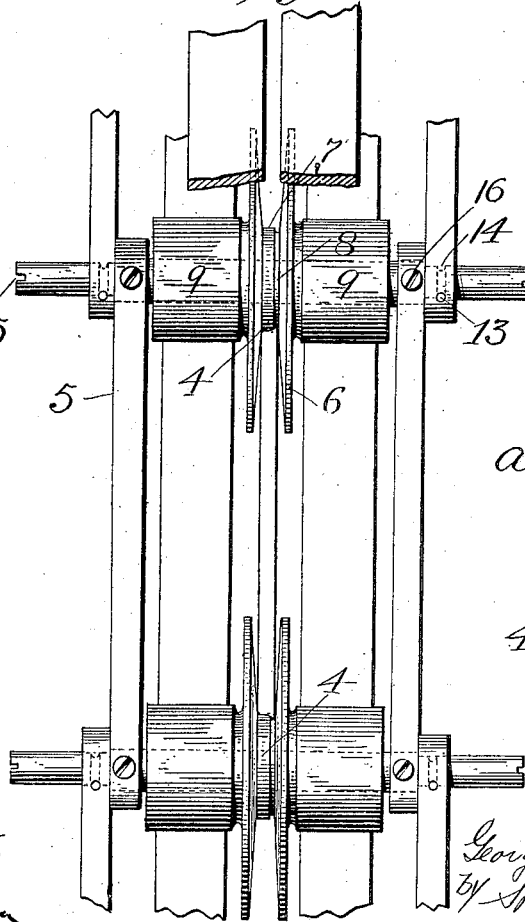
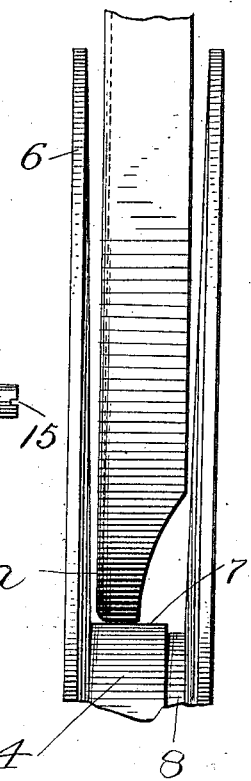

UNITED STATES PATENT OFFICE.

GEORGE H. STEWART, OF LOS ANGELES, CALIFORNIA.

MEANS FOR DETECTING DEFECTIVE CAN-HEADS.

No. 827,760.  Specification of Letters Patent.  Patented Aug. 7, 1906.

Application filed July 8, 1905. Serial No. 268,805.

*To all whom it may concern:*

Be it known that I, GEORGE H. STEWART, a citizen of the United States, residing at Los Angeles, California, have invented certain new and useful Improvements in Means for Detecting Defective Can-Heads, of which the following is a specification.

My invention relates to the manufacture of cans; and my object is to provide means for detecting defective can-heads and separating them from the structurally perfect heads, so that only heads adapted to make perfect joints with the can-bodies will be fed to the heading-machine. In this connection I would not have it understood that the detector mechanism is to be employed only as a part of the feed means of the header, as it will be obvious that said mechanism may be used to sort the good from the defective heads, whether for immediate or subsequent feeding of said heads to the heading-machine.

Among the defects which occur in can-heads are dents and "clips," each of which destroys the perfect circular shape of the head. My detector mechanism is adapted to automatically gage the size of the head, and should the dent or the clip be present the said defective head will be discharged from the machine, and thus sorted from the perfect heads, which are carried by the mechanism to another point of discharge and preferably directed to the feeding-point of the heading-machine.

The invention consists in the features and combination and arrangement of parts hereinafter described, and particularly pointed out in the claims.

In the accompanying drawings, Figure 1 is a side view of a portion of the detector apparatus. Fig. 2 is a cross-sectional view substantially on line 2 2 of Fig. 1 with parts in elevation. Fig. 3 is a plan view of a part of the detector mechanism. Figs. 4 and 5 are detail views in plan, showing portions of the wheels to caliper the can-head with the said heads represented in place and in section. Fig. 6 is a detail view of the discharge end of the apparatus.

The can-heads are fed into the machine through a chute 1, and they strike first upon a pad of felt or other material surrounding a sprocket-wheel 2. This felt provides a yielding surface to prevent damage to the flange of the can-head.

In the position represented in Fig. 1 the can-head as it enters the machine falls between calipering rollers or wheels 4, carried by an endless chain 5. These calipering-wheels have flanges 6, of large diameter, and between these lie the calipering surfaces or peripheries 7, each having a groove 8 at one edge to receive the flared edge of the can-head. The caliper-wheels are also provided with cylindrical portions 9 to roll upon rails 10, supported by the arms 11 of the standards 12. The journal-pins of the caliper-wheels extend through the links of the endless chain, and the said links are held in place by pins 13, passing through the outer links and through grooves 14 in the said journal-pins. These journal-pins are reduced in diameter where they pass through the outer links, thus providing an eccentric relation between the two portions of the journal-pins, so that by turning these pins by means of their kerfed heads 15 the links may be adjusted longitudinally in relation to each other to compensate for wear, and when adjusted the inner links are fixed rigidly to the journal-pins by means of set-screws 16.

The caliper-wheels are set at such a distance apart that their calipering peripheries will contact with the perfect can-heads in a horizontal plane slightly below the centers of the can-heads, so that, as shown in Fig. 1, the said can-heads will be supported between and by the calipering-surfaces of the wheels, and the said can-head will be rotated, so as to bring different portions of its periphery or flange into contact with the said wheels. It will be necessary only to give to each can-head a half-revolution, as one caliper-wheel will contact with one half of the periphery, and the other caliper-wheel will contact with the other half of the periphery of the head, and should a dent or clip portion of the can-head be presented to either calipering-surface the said can-head will drop through between the calipering wheels or rollers, and thus be discharged from the machine, while if the head is perfect or suitable for making a tight joint with the can-body throughout its entire circumference it will be carried along by the chain and discharged either into a suitable receptacle for subsequent feeding to the heading-machine or it may be discharged into a suitable feeding-trough leading to the heading-machine; but in any case the result will be that the perfect heads are sorted from the defective ones.

It will be understood that the clips occur in can-heads by reason of improper cutting of the metal from the sheet of material, one cut slightly overlapping the adjacent cut, so that when the metal is stamped up in the form of a head with a flange the clip will occur in the said flange, for instance, as represented at $a$ in Fig. 5.

By reference to Fig. 4 it will be seen that the can-head is supported by the portion of the flange at $b$, which overlies the corner $c$ of the calipering periphery, the said corner being adjacent to the groove 8, above mentioned. As long as the flange of the head is approximately perfect the can-head will be supported by the caliper-wheels; but if in the rotation of a head a clip or dent is brought to the caliper-surface the corner $c$ will no longer support the flange at this clip or dented portion and the head will be free to fall through between the caliper rollers or wheels, as in Fig. 5. In order to properly hold the can-heads, I provide guide-rails 17, one on each side of the path of the heads and extending parallel to and in a higher plane than the endless chains to afford the necessary guidance to the can-heads and keep them upright, as shown in Fig. 2. These guides are supported by brackets 18 from the rails 10. The endless chains are driven by sprocket-wheel 19 on a shaft 20, supported in one of the standards 12 and driven in any suitable manner. Each sprocket-wheel is provided with arms radiating therefrom, having sockets 20' to receive the journal-pins of the endless chains. The guide-rails 17 curve downwardly and outwardly at the discharge end of the machine, and the perfect heads are taken from the detector mechanism by a plate or finger 21, extending into the path of the heads. This finger or plate 21 may direct the tested can-heads to any suitable point. As the can-heads are brought to the discharging-point they contact with the peripheral surface 22 of the sprocket-wheel 19, and they are thus slightly raised between the caliper wheels or rollers, and riding over the surface of the sprocket-wheel 19 they are taken therefrom and from between the caliper-rollers by the finger or plate 21.

I claim as my invention—

1. In a machine of the class described, caliper-wheels adapted to receive the can-head between them with its periphery in contact with the said wheels and by which the can-head is sustained, if not defective, but between which it passes, if defective, and means for imparting rotary motion to the contacting parts, substantially as described.

2. In a machine of the class described, a pair of caliper-wheels with means for turning the same, said wheels receiving the can-head between them and supporting said head, if not defective, by its periphery while being turned by the turning movement of the caliper-wheels, substantially as described.

3. In a machine of the class described, caliper-wheels with means for causing them to travel and transport the can-head contacting therewith by its periphery and sustained thereby, if not defective, but between which wheels the can-head passes, if defective, and means for imparting rotary motion to the contacting parts, substantially as described.

4. In combination the caliper wheels or rollers adapted to receive the can-heads on edge between them and to support the perfect heads, means for carrying the caliper-wheels from the receiving to the discharge point and means for turning the said caliper-wheels during their traveling movement, substantially as described.

5. In combination in a machine of the class described, caliper-wheels adapted to receive and support the perfect can-heads on edge between them, an endless chain for carrying the caliper-wheels along and means for rotating the caliper-wheels, substantially as described.

6. In combination, caliper-wheels adapted to receive the can-heads between them and to support the perfect heads, an endless chain for moving the caliper-wheels, tracks for turning the caliper-wheels, said tracks engaging lateral extensions of the wheels, substantially as described.

7. In combination, the traveling wheels adapted to receive the can-heads on edge between them to support the perfect heads and to allow the imperfect heads to drop through, and guide-rails for holding the can-heads upright, substantially as described.

8. In combination in a machine of the class described, a pair of caliper-wheels adapted to support perfect heads between them but to allow imperfect heads to drop through said caliper-wheels, each having a groove at one side of its caliper-surface to receive the flaring edge of the head-flange, substantially as described.

9. In combination, in a machine of the class described, sprocket-wheels, an endless-chain carrier passing over the same, caliper-wheels adapted to receive the can-heads between them and carried by the said chain-carrier, means for feeding the can-heads to the caliper-wheels at one of the sprocket-wheels, said sprocket-wheel having a cushioning-surface for the impact of the can-heads, substantially as described.

10. In combination the sprocket-wheels, the chain-carrier, the caliper-wheels thereon, one of said sprocket-wheels being adapted to lift the can-heads upwardly in relation to the caliper-wheels, the said can-heads being discharged after passing over the said sprocket-wheel, substantially as described.

11. In combination in a machine of the class described, caliper-wheels adapted to receive and support the perfect can-heads on edge between them, an endless carrier for the caliper-wheels and means for rotating the caliper-wheels, substantially as described.

12. In combination in a machine of the class described, caliper-wheels adapted to receive and support the perfect can-heads on edge between them, an endless carrier for the caliper-wheels, means for rotating the caliper-wheels, the said endless carrier discharging the perfect can-heads automatically at its downwardly-moving side, substantially as described.

13. In combination an endless carrier caliper-wheels carried thereby, drive-wheels connected to the caliper-wheels and fixed means engaging said drive-wheels to turn the same as they are moved along by the carrier, substantially as described.

14. In a machine of the class described, rotary caliper-wheels receiving the can-head between them by which the can-head is held by its periphery, if not defective, and means for feeding the can-heads into position between the caliper-wheels, the said head passing between the said wheels, if defective, substantially as described.

In testimony whereof I affix my signature in presence of two witnesses.

GEORGE H. STEWART.

Witnesses:
HENRY E. COOPER,
EDWARD N. SARTON.